(12) United States Patent
Her et al.

(10) Patent No.: US 10,642,100 B2
(45) Date of Patent: May 5, 2020

(54) BACKLIGHT UNIT

(71) Applicant: LG DISPLAY CO., LTD., Seoul (KR)

(72) Inventors: Hyunggu Her, Paju-si (KR); Doyune Kim, Paju-si (KR); Jinsan Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/223,577

(22) Filed: Dec. 18, 2018

(65) Prior Publication Data

US 2019/0187518 A1 Jun. 20, 2019

(30) Foreign Application Priority Data

Dec. 20, 2017 (KR) .......................... 10-2017-0176270

(51) Int. Cl.
*G02F 1/1335* (2006.01)
*G02F 1/13357* (2006.01)

(52) U.S. Cl.
CPC .. *G02F 1/133608* (2013.01); *G02F 1/133606* (2013.01); *G02F 1/133611* (2013.01); *G02F 2201/54* (2013.01); *G02F 2202/28* (2013.01)

(58) Field of Classification Search
CPC ......... G02F 1/133608; G02F 1/133606; G02F 1/133611; G02F 2201/54; G02F 2202/28
See application file for complete search history.

(56) References Cited

U.S. PATENT DOCUMENTS

| | | | |
|---|---|---|---|
| 2007/0103908 A1* | 5/2007 | Tabito | G02F 1/133608 362/294 |
| 2009/0201667 A1* | 8/2009 | Matsuo | G02F 1/133608 362/97.1 |
| 2018/0364517 A1* | 12/2018 | Oh | G02F 1/133604 |
| 2019/0187518 A1* | 6/2019 | Her | G02F 1/133608 |

FOREIGN PATENT DOCUMENTS

| | | |
|---|---|---|
| KR | 10-2006-0008519 A | 1/2006 |
| KR | 10-2011-0072355 A | 6/2011 |
| KR | 10-2011-0113283 A | 10/2011 |
| KR | 10-2012-0034083 A | 4/2012 |
| KR | 10-2012-0130034 A | 11/2012 |
| KR | 10-2013-0066815 A | 6/2013 |
| KR | 10-2014-0096802 A | 8/2014 |
| KR | 10-2015-0145874 A | 12/2015 |
| KR | 10-2017-0013696 A | 2/2017 |

* cited by examiner

*Primary Examiner* — Anabel Ton
(74) *Attorney, Agent, or Firm* — Seed IP Law Group LLP

(57) ABSTRACT

A backlight unit is disclosed. The backlight unit includes a light source module having a light source and a light source printed circuit board connected to the light source, a diffuser placed over the light source and a supporting member placed under the diffuser and keeping the light source and the diffuser separated by a preset distance. The supporting member includes a groove formed in the top surface facing the diffuser, with an adhesive layer disposed inside of the groove.

19 Claims, 13 Drawing Sheets

Fixing by screw

Fixing by hook

Fixing with double-sided tape

BACKLIGHT UNIT

CROSS-REFERENCE TO RELATED APPLICATION(S)

This application claims the priority benefit of Korean Patent Application No. 10-2017-0176270 filed on Dec. 20, 2017, which is incorporated herein by reference for all purposes as if fully set forth herein.

BACKGROUND

Technical Field

The present disclosure relates to a backlight unit.

Description of the Related Art

Liquid-crystal displays are used in portable computers such as laptops, office automation equipment, audio/video equipment, and indoor and outdoor signage. A liquid-crystal display displays an image by controlling the electric field applied to a liquid crystal layer on a liquid-crystal display panel and modulating the light coming from a backlight unit (BLU).

Backlight units may be classified into direct-lit backlight units and edge-lit backlight units. In a direct-lit backlight unit, a plurality of light sources are arranged under a liquid-crystal panel. In the direct-lit backlight unit, the light sent from the light sources may be spread evenly across the back of the liquid-crystal panel as it passes through a diffuser placed on the light sources and at least one optical sheet placed on the diffuser.

However, some parts of the diffuser and optical sheets may sag under their weights, and the diffuser and optical sheets may sag or move as they are thermally deformed. This degrades the optical characteristics of the backlight unit, leading to a desire for a solution to this problem.

BRIEF SUMMARY

An aspect of the present disclosure is to improve the optical characteristics of a backlight unit by preventing a diffuser from coming off or sagging.

A backlight unit is disclosed. In one embodiment, the backlight unit includes a light source module having a light source and a light source printed circuit board connected to the light source, a diffuser placed over the light source and a supporting member placed under the diffuser and keeping the light source and the diffuser separated by a preset distance. The supporting member includes a groove formed in the top surface facing the diffuser, with an adhesive layer disposed inside of the groove.

In one embodiment, the backlight unit further includes a fixing mount to which the supporting member is fixed and a metal layer interposed between the underside of the supporting member and the fixing mount.

In one embodiment, the fixing mount is the light source printed circuit board.

In one embodiment, the supporting member is fixed to the fixing mount using surface-mount technology (SMT).

In one embodiment, the supporting member is made of a metal material, and the metal layer is made of nickel (Ni), tin (Sn), or an alloy thereof.

In one embodiment, the supporting member includes a cover having an accommodating part formed therein and a first open hole for opening part of the top of the accommodating part and a core having a base portion and a supporting portion. The base portion is contained in the cover and laterally movable. The supporting portion extends from the base portion through the first open hole and supporting the diffuser. The groove is formed in the top surface of the supporting portion.

In one embodiment, the cross-sectional area of the base portion is smaller than the cross-sectional area of the accommodating part.

In one embodiment, the area of the first open hole is smaller than the cross-sectional area of the base portion.

In one embodiment, the cover includes a second hole for opening a part of the bottom of the accommodating part, and the base portion includes a recess formed in the bottom surface and opening out through the second open hole.

In one embodiment, the supporting member is formed of a white-colored material, or a white coating layer is coated onto the surface of the supporting member, or the supporting member is formed of a transparent material.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
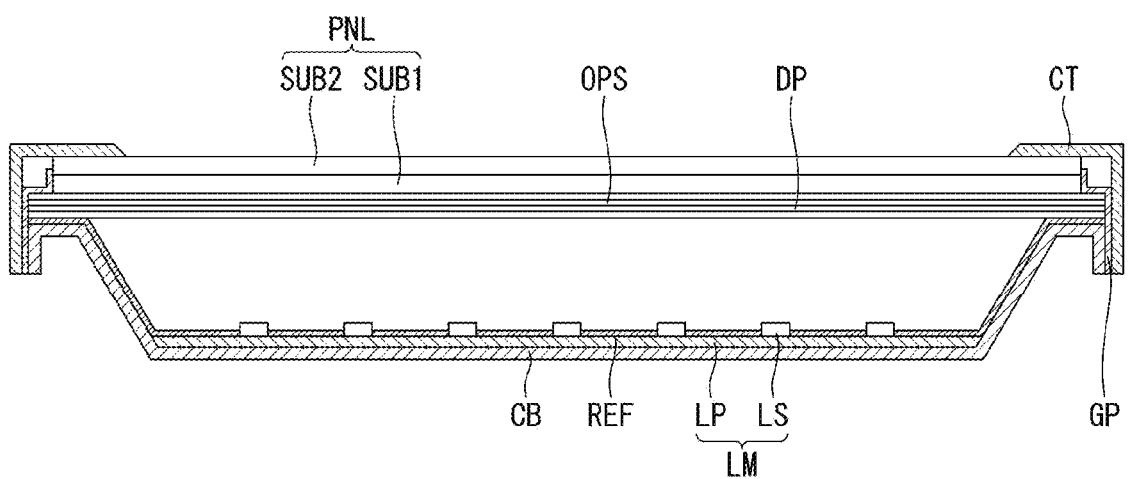
FIG. 1 is a cross-sectional view schematically showing a liquid-crystal display according to an embodiment of the present disclosure.

Hereinafter, embodiments of the present disclosure will be described in detail with reference to the attached drawings. Throughout the specification, like reference numerals denote substantially like components. In describing the present disclosure, a detailed description of known functions or configurations related to the present disclosure will be omitted when it is deemed that they may unnecessarily obscure the subject matter of the present disclosure. The same elements are given the same reference numerals in various embodiments, and they will be typically described in a first embodiment, and will be omitted in the other embodiments.

It will be understood that, although the terms "first", "second", etc. may be used herein to describe various elements, these elements are not limited by these terms. These terms are used to distinguish one element from another element.

FIG. 1 is a cross-sectional view schematically showing a liquid-crystal display according to an embodiment of the present disclosure.

Referring to FIG. 1, the liquid-crystal display according to the embodiment of the present disclosure includes a liquid-crystal display panel PNL and a backlight unit.

The liquid-crystal display panel PNL includes a thin-film transistor substrate SUB1, an opposing substrate SUB2, and a liquid crystal layer interposed between the thin-film transistor substrate SUB1 and the opposing substrate SUB2. An upper polarization film and a lower polarization film may be placed on the thin-film transistor substrate SUB1 and opposing substrate SUB2 of the liquid-crystal display panel PNL. The upper polarization film and the lower polarization film allow some of the components of the light emitted from the backlight unit, which are directed towards a particular direction, to pass through.

The thin-film transistor substrate SUB1 includes a thin-film transistor array having a plurality of pixels. The pixels may be defined by, but not limited to, a plurality of gate lines and a plurality of data lines. Each pixel may include a thin-film transistor connected to a gate line and a data line, a pixel electrode connected to the thin-film transistor, and a common electrode placed adjacent to the pixel electrode, to which a common voltage is supplied. The common electrode may be placed on the opposing substrate SUB2 depending on how the liquid crystal layer is driven. A pad portion connected to a panel driver is provided at one side of the thin-film transistor substrate SUB1.

The opposing substrate SUB2 may be a color filter array substrate. However, in the case that the liquid-crystal display panel PNL is implemented as COT (color filter on TFT) or TOC (TFT on color filter), the color filters may be formed on the thin-film transistor substrate SUB1. The opposing substrate SUB2 may have a relatively smaller area than the thin-film transistor substrate SUB1, but not limited to it. The opposing substrate SUB2 may be placed opposite the thin-film transistor substrate SUB1 so as to overlap the thin-film transistor substrate SUB1 except the pad portion.

In an example, the opposing substrate SUB2 may be located on the upper surface of the thin-film transistor substrate SUB1. In another example, the thin-film transistor substrate SUB1 may be reversed so that it is located on the opposing substrate SUB2.

Detailed configurations of the thin-film transistor substrate SUB1 and opposing substrate SUB2 may be in various forms in accordance with the driving mode of the liquid crystal layer. The liquid crystal layer is driven by an electric field produced by the potential difference between data voltages supplied to the pixel electrodes via the data lines and a common voltage supplied to the common electrode, and adjusts the amount of light transmitted through the liquid-crystal display panel PNL. The liquid crystal layer may be implemented in at least one of various liquid crystal modes—for example, TN (Twisted Nematic) mode, VA (Vertical Alignment) mode, IPS (In-Plane Switching) mode, and FFS (Fringe Field Switching) mode.

The panel driver is connected to the pad portion provided on the thin-film transistor substrate SUB1 and transmits a signal for driving each pixel of the liquid-crystal display panel PNL. The panel driver may include at least one circuit film bonded to the pad portion of the liquid-crystal display panel PNL and a printed circuit board connected to the circuit film. The circuit film may be implemented as, but not limited to, chip-on-film, in which driving IC (integrated circuits) are mounted on a flexible film. One end of the circuit film may be connected to the thin-film transistor substrate SUB1, and the other end may be connected the printed circuit board. One end of the circuit film may be bonded to the thin-film transistor substrate SUB1 through an anisotropic conductive film.

The backlight unit is provided at the back of the liquid-crystal display panel PNL and directs light towards the liquid-crystal display panel PNL. The backlight unit includes a light source module LM, a diffuser DP, and a reflector REF.

The light source module LM includes a light source LS and a light source printed circuit board LP. The light source LS may be implemented as, but not limited to, a light-emitting diode LED which offers the benefits of high efficiency, high brightness, and low power consumption. The position and density of the light source LS may be properly selected in consideration of optical characteristics such as the radiation angle and optical gap (OG) of the light source LS.

The light source LS is turned on and off by an electrical signal received from a light source driver via the printed circuit board LP. A circuit for electrically connecting the light source LS and the light source driver are formed on the light source printed circuit board LP. The light source LS may be placed on the printed circuit board LP. The light source printed circuit board LP may be provided in the form of, but not limited to, a metal core printed circuit board (MPCB) with layers of aluminum laminated on the bottom, in order to efficiently release the heat produced from the light source LS to the outside.

The light emitted from the light source module LM may be directly incident on the diffuser DP, or may be reflected by the reflector REF and incident on the diffuser DP. The light supplied to the diffuser DP from the light source module LM may be diffused towards the liquid-crystal display panel PNL. The backlight unit may further include an optical sheet portion OPS positioned over the diffuser DP. The light that has passed through the diffuser DP may be spread evenly across the back of the liquid-crystal panel as it passes through the optical sheet portion OPS. The optical sheet portion OPS may include a diffusion sheet and a light collection sheet, and may include various functional sheets such as a DBEF (dual brightness enhancement film).

The reflector REF functions to reflect the light delivered from the light source module LM towards the diffuser DP. The reflector REF may be placed on, but not limited to, the light source module LM. The reflector REF, if placed on the light source module LM, may include through holes for exposing the light source LS.

The liquid-crystal display panel PNL and the backlight unit may be assembled together by a casing member and implemented as a liquid crystal module LCM. The casing member may include a guide panel GP and a cover bottom CB, and may further include a case top CT if desired. The guide panel GP, cover bottom CB, and case top CT may be fastened together so that the backlight unit and the liquid-crystal display panel PNL are contained in them.

The cover bottom CB has a preset shape to contain the backlight unit and support it. The cover bottom CB may be made of a material with high thermal conductivity and high strength so as to smoothly release heat out of the panel driver and/or the light source module LM. In an example, the cover bottom CB may be made of a metal material such as aluminum, aluminum nitride (AlN), electrogalvanized steel sheet (EGI), stainless steel (SUS), galvalume (SGLC), aluminum-coated steel sheet (so-called ALCOSTA), or tin-coated steel sheet (SPTE). Also, a high-conductivity material may be coated on this metal sheet to facilitate heat transfer.

The guide panel GP may support the edge of the liquid-crystal display panel PNL. The guide panel GP may have the shape of a rectangular frame drilled at the center. The guide panel GP may be made of, but not limited to, a plastic material, such as polycarbonate, that can be molded.

The case top CT may be placed in such a way as to cover the top edge and side of the liquid-crystal display panel PNL. The case top CT may function to mask the bezel area. The case top CT may be omitted if desired. The case top CT may be fastened to the guide panel GP and the cover bottom CB and fixed in place.

Figure 2:
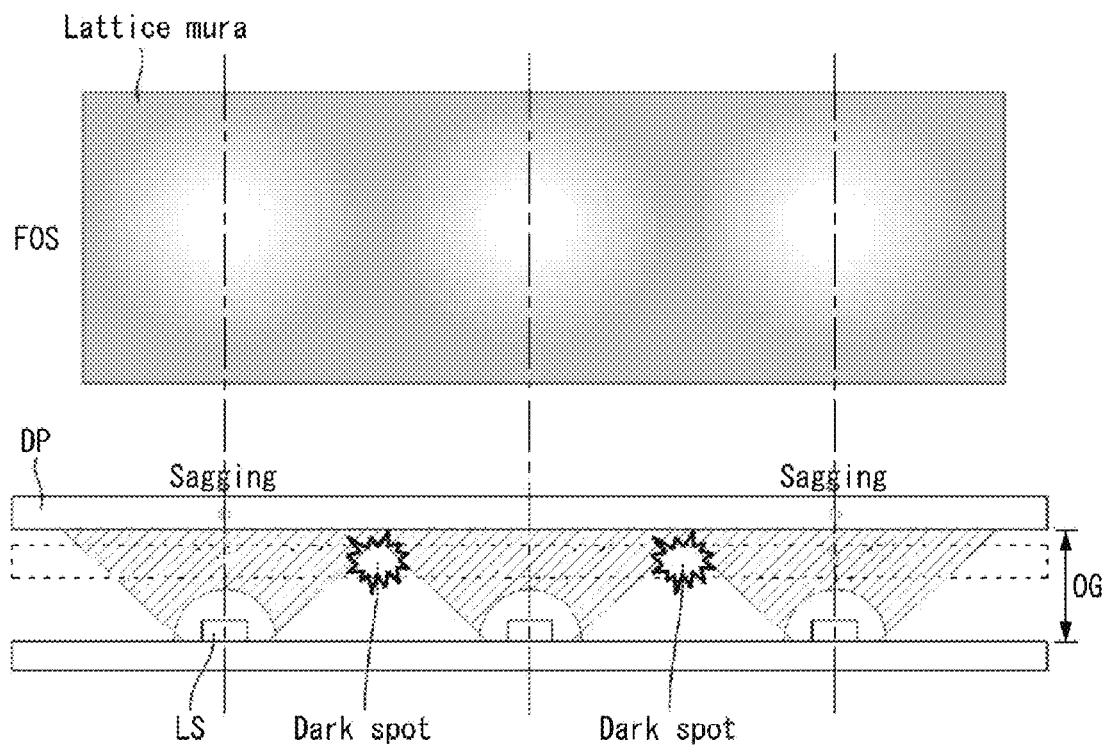
FIGS. 2 and 3 are views for explaining the necessity of a diffuser supporting member.
Figure 3:
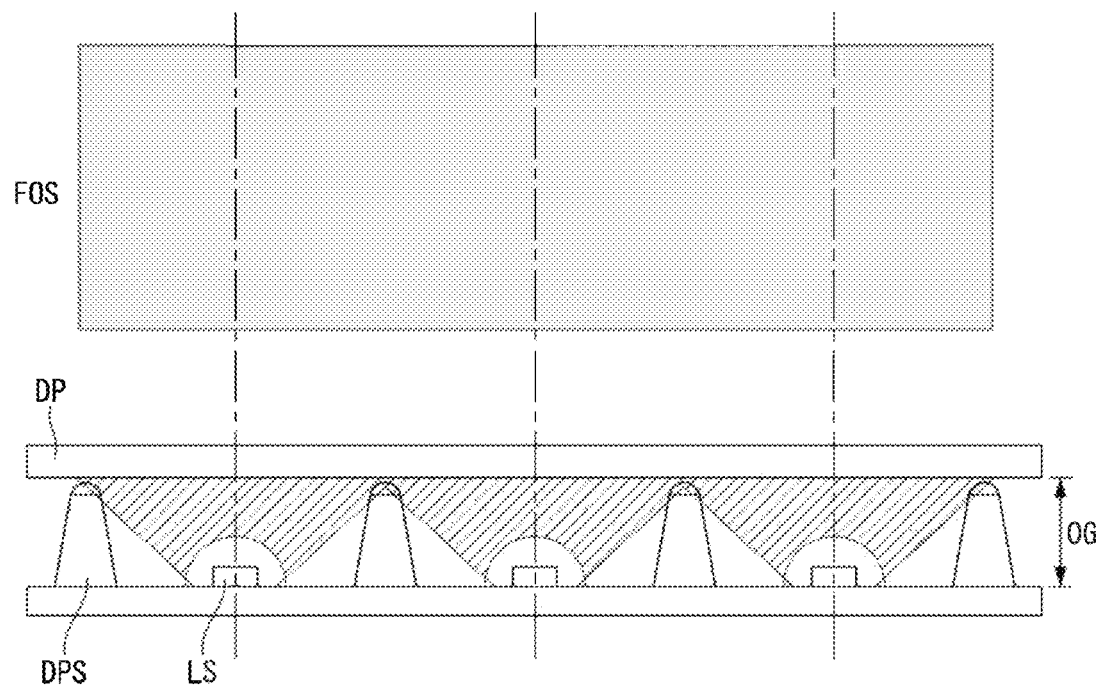

FIGS. 2 and 3 are views for explaining advantages of a diffuser supporting member.

Referring to FIG. 2, the diffuser DP may sag under its weight and/or by the heat generated from the light source LS, drivers, etc. In this case, an area that does not satisfy the predetermined optical gap OG may be created depending on position, and the user may perceive this area as a dark spot because no light is provided to it. That is, sagging of the diffuser DP may cause a lattice mura, which may significantly degrade the optical characteristics (or display characteristics) of the backlight unit.

Referring to FIG. 3, the backlight unit further includes a diffuser supporting member DPS for preventing sagging of the diffuser DP. The supporting member DPS may function to prevent the diffuser DP from sagging under its weight or due to heat (i.e., the support member DPS ensures that the diffuser is kept substantially planar), and keep the diffuser DP and the light source LS separated by a preset distance. As an example, as shown in FIG. 3, the diffuser supporting member DPS is positioned between the diffuser DP and, for example, the printed circuit board LP. The diffuser supporting member DPS includes a plurality of members or spacers positioned where dark spots are likely to occur. Namely, each of the plurality of members are positioned adjacent to a light source LS, or between two adjacent light sources LS. In one embodiment, as shown in FIG. 3, the plurality of members and the light sources LS are positioned on the printed circuit board LP in an alternating fashion. In one embodiment, as shown in FIG. 3, the plurality of members is equally spaced from each other. The diffuser supporting member DPS maintains a preset distance between the printed circuit board LP and the diffuser DP such that the preset distance satisfies the condition for the optical gap OG. Accordingly, the lattice mura caused by sagging of the diffuser DP may be minimized, and this allows for providing a backlight unit with significantly improved optical characteristics and a liquid-crystal display comprising the same.

First Embodiment

Figure 4A:
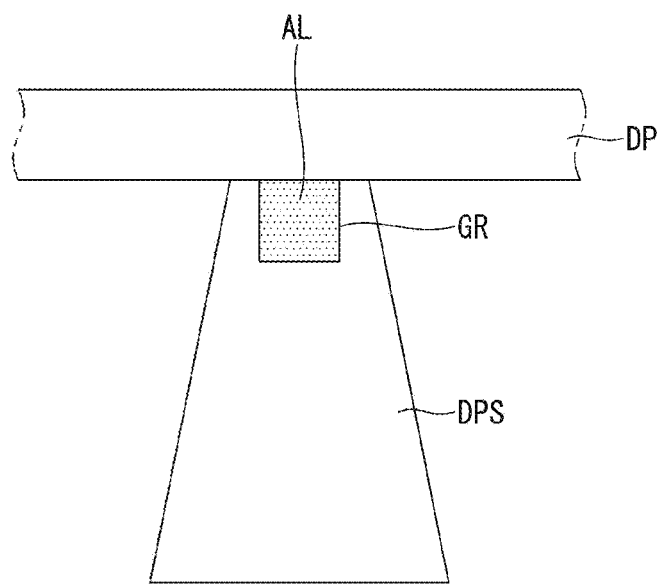
FIGS. 4A and 4B are cross-sectional views of a supporting member according to a first exemplary embodiment of the present disclosure.
Figure 4B:
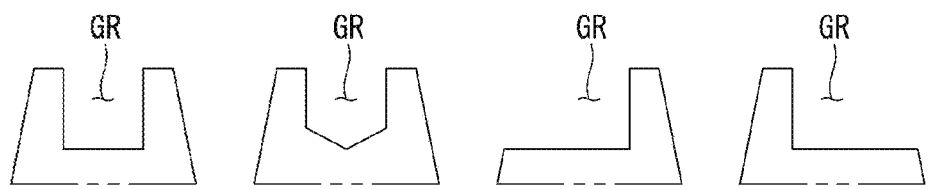
Figure 5A:
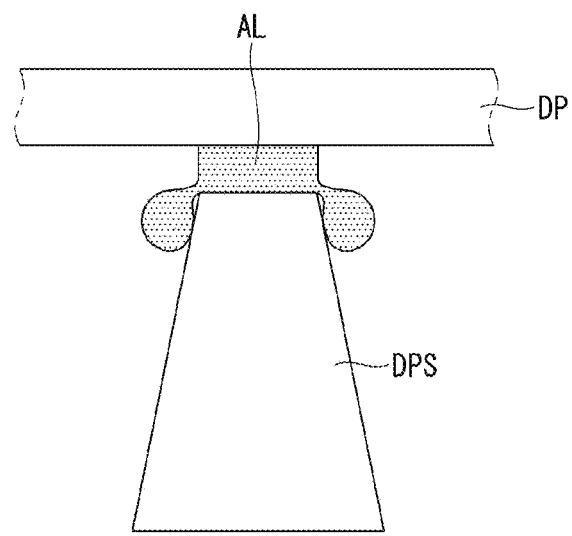
FIGS. 5A and 5B are views for explaining the effects of the present disclosure.
Figure 5B:
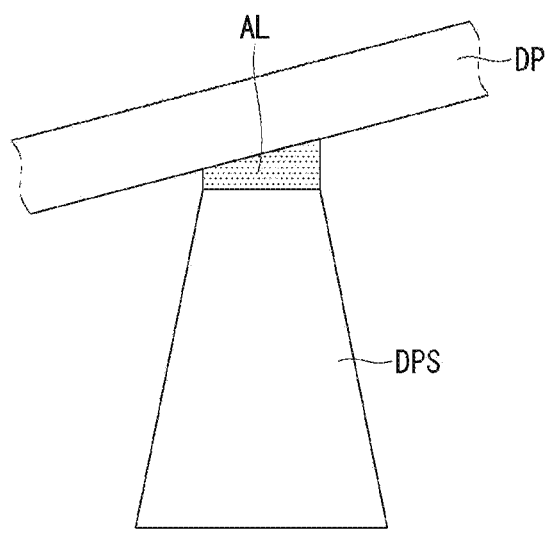

FIGS. 4A and 4B are cross-sectional views of a supporting member DPS (more specifically a particular member of the supporting member DPS) according to a first embodiment of the present disclosure. FIGS. 5A and 5B are views for explaining the effects of the present disclosure.

Referring to FIGS. 4A and 4B, a backlight unit according to the first embodiment of the present disclosure includes a supporting member DPS. The supporting member DPS may be made of, but not limited to, rubber, like silicone rubber (Si-rubber), plastic, ceramic, or a metal material. To prevent incident light from being absorbed/lost by the supporting member DPS and perceived as a dark spot by the user, the supporting member DPS may be formed of a white-colored material that can reflect light, or a white coating layer may be coated onto the surface of the supporting member DPS. Alternatively, the supporting member DPS may be formed of a transparent material through which light can pass. This offers the advantage of minimizing the visibility of dark spots.

The supporting member DPS according to the first embodiment of the present disclosure includes a groove GR or cavity. The groove GR may be formed by inwardly and partially recessing the top surface of the supporting member DPS facing the diffuser DP. The cross-sectional shape of the groove GR may be polygonal, such as a rectangle or pentagon, or circular, elliptical, etc. Also, the groove GR may have the shape of a cross-section that is open at one side.

An adhesive layer AL is disposed inside the groove GR. More specifically, an adhesive material may be filled in the groove GR to form an adhesive layer AL. The adhesive material may be, but not limited to, a glue. The adhesive layer AL may be contained in the groove GR and aligned in place.

The adhesive layer AL may be formed between the diffuser DP and the supporting member DPS and fix both of them together, thereby preventing the diffuser DP from falling out of place. That is, if the diffuser DP falls out of place due to sagging of the diffuser DP, the optical characteristics of the backlight unit may be distorted, thus degrading display quality. Therefore, in the first embodiment of the present disclosure, an adhesive layer AL is formed on the top surface of the supporting member DPS to fix the diffuser DP.

However, referring to FIGS. 5A and 5B, in the case that the adhesive layer AL is interposed between the diffuser DP and the supporting member DPS, the adhesive material making up the adhesive layer AL may flow before hardening. As a result, the adhesive material will not remain in its place after coated onto the supporting member DPS, but may flow down one side of the supporting member DPS. This leads to an adhesion failure, and the diffuser DP and the supporting member DPS cannot be held together but may fall out or be misaligned (FIG. 5A). Moreover, the diffuser DP may be fixed to the supporting member DPS at a predetermined tilt (FIG. 5B) since the adhesive material is not uniform in thickness due to the movement of the adhesive material before hardening. Such defects may significantly degrade the optical characteristics of the backlight unit.

The first embodiment of the present disclosure may prevent the adhesive material making up the adhesive layer AL from flowing down and make the adhesive layer AL substantially uniform in thickness by including a groove GR. Therefore, the first embodiment of the present disclosure provides a backlight unit with significantly improved optical characteristics by overcoming the aforementioned problems.

Second Embodiment

Figure 6:
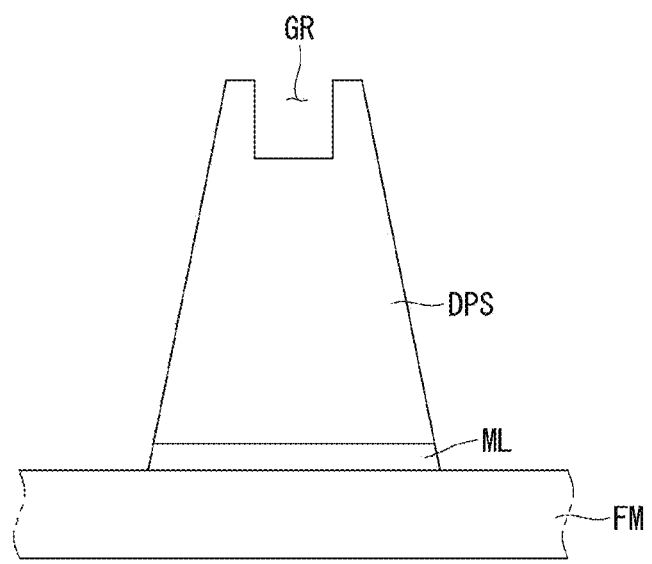
FIGS. 6, 7A, and 7B are cross-sectional views showing a fastening structure for a supporting member according to a second embodiment of the present disclosure.
Figure 7A:
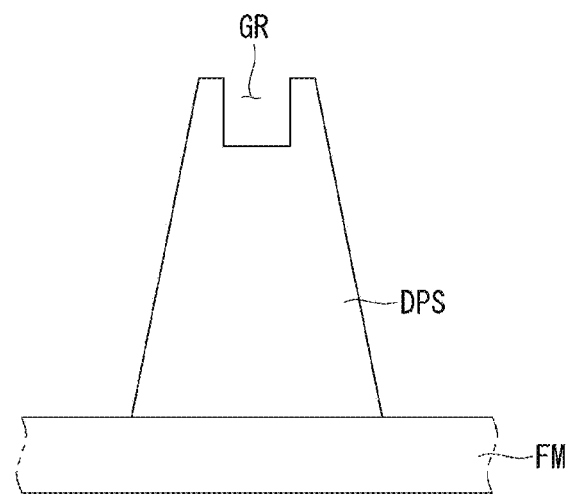
Figure 7B:
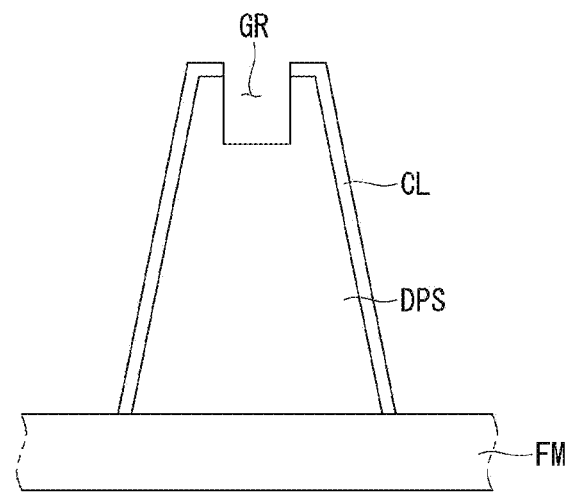
Figure 8A:
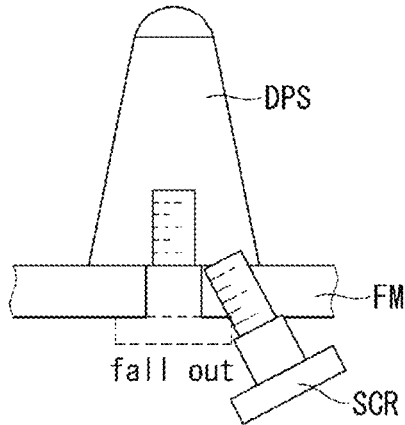
FIGS. 8A to 8C are views for explaining the effects of the second embodiment of the present disclosure.
Figure 8B:
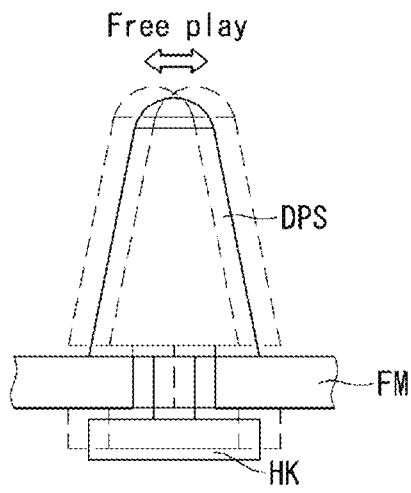
Figure 8C:
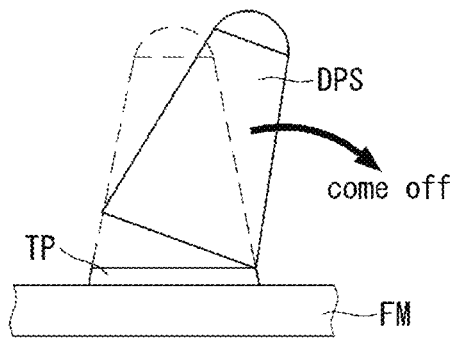

FIGS. 6, 7A, and 7B are cross-sectional views showing a fastening structure for a supporting member according to a second embodiment of the present disclosure. FIGS. 8A to 8C are views for explaining the effects of the second embodiment of the present disclosure.

Referring to FIGS. 6, 7A, and 7B, the backlight unit according to the second embodiment of the present disclosure includes a supporting member DPS. The supporting member DPS is fixed to a fixing mount FM provided under the supporting member DPS. The fixing mount FM may be a light source printed circuit board LP (in FIG. 1). The supporting member DPS may be fixed to the fixing mount FM using surface-mount technology (or surface-mount type) (SMT). The supporting member DPS may be thermally bonded to the fixing mount FM and mounted onto its surface using SMT.

Referring to FIG. 6, a metal layer ML (or metal coating layer) may be interposed between the underside of the supporting member DPS and the fixing mount FM. In an example, if the supporting member DPS is not made of a metal material (e.g., made of plastic), a metal layer ML interposed between the underside of the supporting member DPS and the fixing mount FM is advantageous in order to apply SMT. In another example, if the supporting member DPS is made of a metal material, a metal layer ML made of a metal such as nickel (Ni) or tin (Sn) or an alloy thereof may be likewise interposed (or coated) between the underside of the supporting member DPS and the fixing mount FM, in order to improve the workability of SMT.

Referring to FIGS. 7A and 7B, if the supporting member DPS is made of a metal material, the metal material ML may not be formed between the bottom surface of the supporting member DPS and the fixing mount FM. For example, the supporting member DPS may be directly attached to the fixing mount FM. It is needless to say that, as mentioned previously, the metal layer ML may be interposed to improve workability. If the supporting member DPS is made of a metal material, a coating layer CL of white-colored material may be formed on the surface of the supporting member DPS in order to induce reflection of the light traveling towards the supporting member DPS.

In the second embodiment of the present disclosure, the supporting member DPS and the fixing mount FM may stay firmly fastened by an automation process using SMT, as well as significantly reducing operation time, thus preventing the supporting member DPS from falling out.

More specifically, referring to FIGS. 8A to 8C, a variety of methods for fixing the supporting member DPS to the fixing mount FM may be proposed. If the supporting member DPS and the fixing mount FM are fastened by a screw SCR, for instance, the screw SCR may fall out due to external factors such as external impact and vibration, the assembling process takes a long time compared to other methods, the manufacturing costs are high, and the defective rate may rise with the increased number of processes. Also, the fastening structure takes up much space, which may not be very affordable. If the supporting member DPS and the fixing mount FM are fastened by a hook HK, this can easily create space for movement in the fastening structure using the hook HK, thus allowing movement. This may cause damage due to interference with other structural parts. If the supporting member DPS and the fixing mount FM are fastened with double-sided tape TP, they can hardly remain firmly fastened due to the limited adhesive strength of the double-sided tape TP, and the supporting member DPS comes off easily. Moreover, the aforementioned methods have their limitations when it comes to improving defective rate. The second embodiment of the present disclosure has the advantage of avoiding the above-mentioned defects since it uses an automation process using SMT.

Third Embodiment

Figure 9:
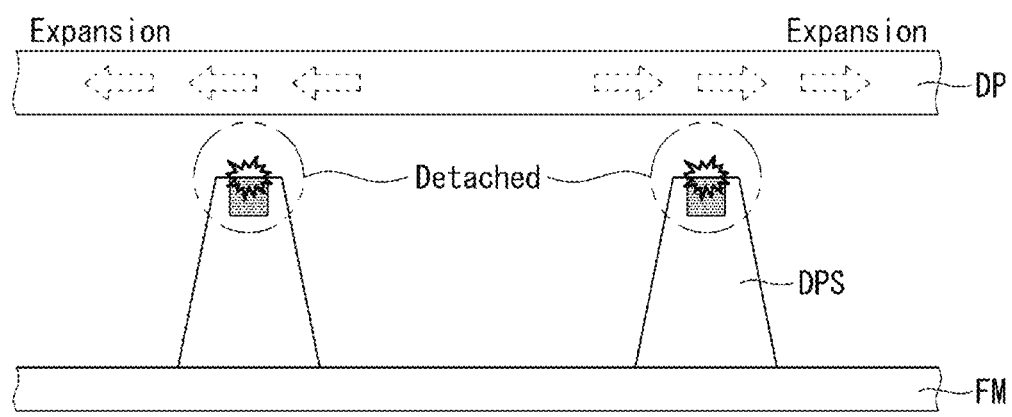
FIG. 9 is a view for explaining problems caused from thermal deformation of the diffuser.
Figure 10:
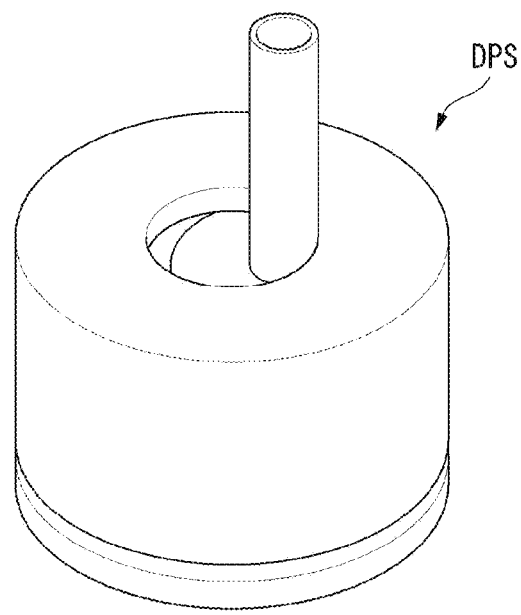
FIGS. 10 and 11 are a perspective view and cross-sectional view showing a supporting member according to a third embodiment of the present disclosure.
Figure 11:
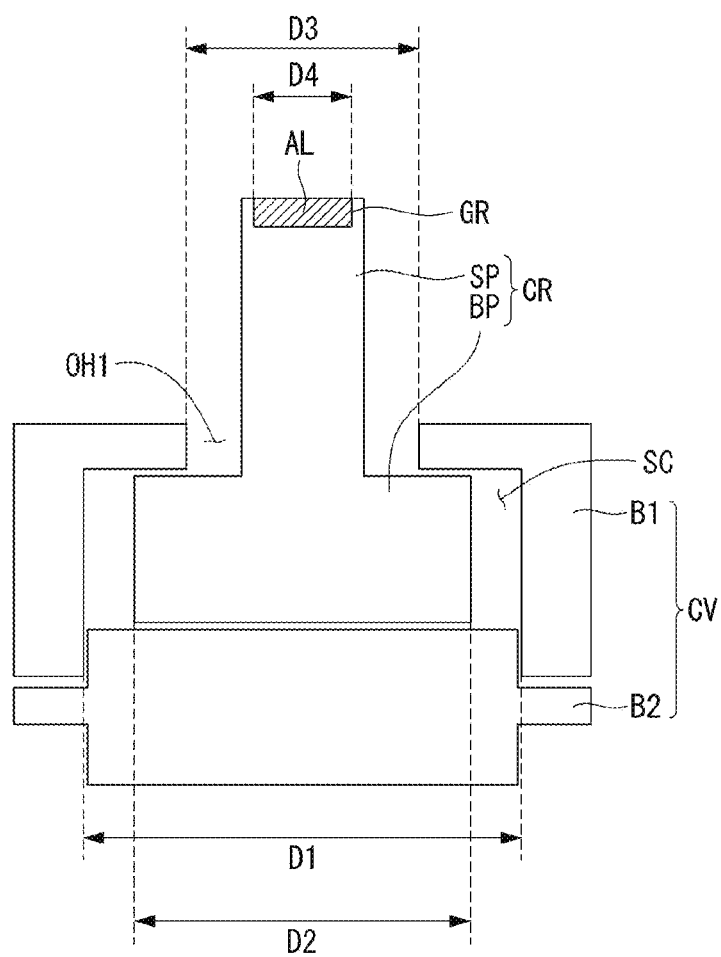
Figure 12:
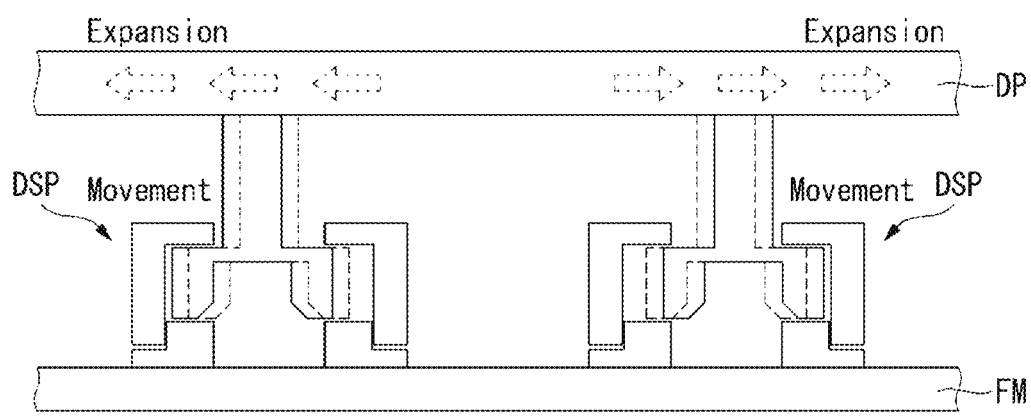
FIG. 12 is a view for explaining the effects of the third embodiment of the present disclosure.

FIG. 9 is a view for explaining problems caused from thermal deformation of the diffuser. FIGS. 10 and 11 are a perspective view and cross-sectional view showing a supporting member according to a third embodiment of the present disclosure. FIG. 12 is a view for explaining the effects of the third embodiment of the present disclosure.

Referring to FIG. 9, the degree of expansion, contraction, or displacement of the diffuser DP may vary with external factors such as changes in temperature or humidity. In this case, the supporting member DPS and the diffuser DP may not be fixed by the adhesive layer AL but may be detached from each other. Thus, the optical characteristics of the backlight unit may be distorted, thus degrading display quality. The third embodiment of the present disclosure proposes a novel supporting member DPS capable of preventing such defects.

Referring to FIGS. 10 and 11, a backlight unit according to the third embodiment of the present disclosure includes a supporting member DPS. The supporting member DPS includes a cover CV and a core CR contained in the cover CV.

The cover CV may be divided into, but not limited to, a first body B1 and a second body B2 to ensure the ease of assembling. That is, the first body B1 and second body B2 of the cover CV may be formed as a single unit, or the first body B1 and the second body B2 may be formed separately and assembled together. The first body B1 may determine the outer shape of the upper portion of the cover CV, and the second body B2 may determine the outer shape of the lower portion of the cover CV. The bottom surface of the second body B2 may be fixed to a fixing mount FM. In an example, the bottom surface of the second body B2 may be fixed to the fixing mount FM by SMT or caulking. The fixing mount FM may be, but not limited to, a light source printed circuit board LP (in FIG. 1).

The first body B1 and the second body B2 are fastened together to form an internal space or cavity. The internal space formed by the first body B1 and the second body B2 may be called an accommodating part SC. At least part of the core CR is movably inserted into the accommodating part SC such that the core CR is able to move within the accommodating part SC. The first body B1 and the second body B2 may restrain or limit the lateral movement (or leftward/rightward movement) of the core CR to a preset range and restrain or limit its upward/downward movement. A first open hole OH1 is formed in a part of the top of the first body B1. The top of the accommodating part SC is open through the first open hole OH1.

The core CR includes a base portion BP and a supporting portion SP. The base portion BP is placed movably in the accommodating part SC. The cross-sectional area D1 of the base portion BP is smaller than the cross-sectional area D2 of the accommodating part SC. Thus, the base portion BP is laterally moveable in the accommodating part SC. That is, the lateral movement of the core CR is restrained to a preset range by the first body B1 and the second body B2. The upward/downward movement of the base portion BP is restrained by the first body B1 and the second body B2. That is, the amount of upward/downward movement of the base portion BP may be minimized. Also, the area D3 of the first open hole OH1 is set smaller than the cross-sectional area D1 of the base portion BP. Accordingly, the base portion BP may be confined in the accommodating part SC and kept from falling out of the cover CV.

The supporting portion SP may extend upward from the base portion BP and pass through the first open hole OH1 of the first body B1. The supporting portion SP extending through the first open hole OH1 supports the bottom of the diffuser DP. The cross-sectional area D4 of the supporting portion SP is set smaller than the area D3 of the first open hole OH1. Thus, the supporting portion SP is laterally movable in the first open hole OH1. The lateral movement of the core CR may be restrained to a preset range by the first open hole OH1.

The supporting portion SP includes a groove GR. The groove GR may be formed by inwardly and partially recessing the top surface of the supporting portion SP facing the diffuser DP. The cross-sectional shape of the groove GR may be polygonal, such as a rectangle or pentagon, or circular, elliptical, etc. Also, the groove GR may have the shape of a cross-section that is open at one side.

An adhesive layer AL is formed on the inside of the groove GR. More specifically, an adhesive material may be filled in the groove GR to form an adhesive layer AL. The adhesive material may be, but not limited to, a glue. The adhesive layer AL may be contained in the groove GR and aligned in place. The adhesive layer AL functions to fix the diffuser DP to the supporting portion SP by its adhesive strength.

The adhesive layer AL may be formed between the diffuser DP and the supporting portion SP and fix both of them, thereby preventing the diffuser DP from falling out of place. That is, if the diffuser DP falls out of place due to sagging of the diffuser DP, the optical characteristics of the backlight unit may be distorted, thus degrading display quality. Therefore, in the third embodiment of the present disclosure, an adhesive layer AL is formed on the top surface of the supporting portion SP to fix the diffuser DP.

Referring to FIG. 12, the backlight unit according to the third embodiment of the present disclosure includes a supporting member DP having a core CR that can move in response to the expansion or contraction of the diffuser DP, which allows the supporting member DPS and the diffuser DP to be fixed by the adhesive layer AL, even if the diffuser DP expands or contracts. This avoids degradation in display quality, caused by distortion of the optical characteristics of the backlight unit.

Fourth Embodiment

Figure 13A:
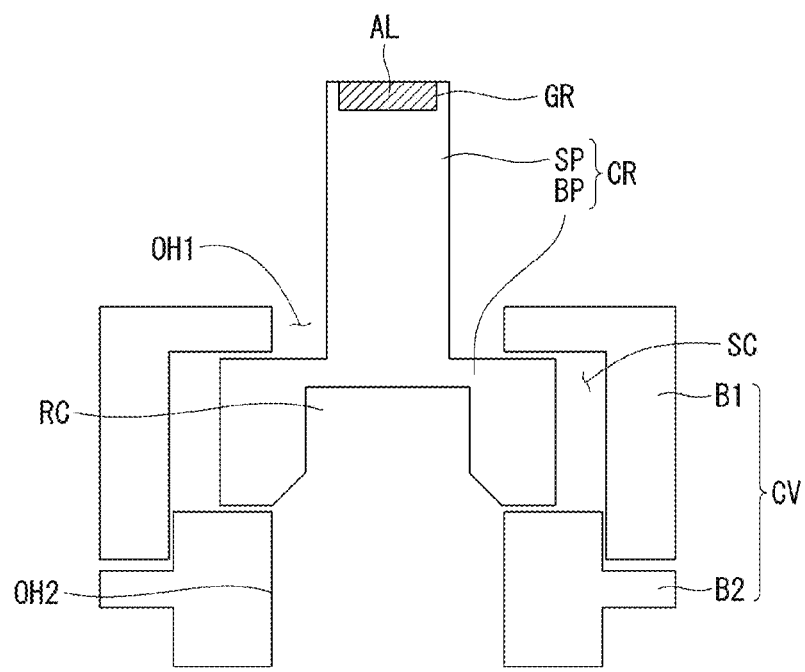
FIGS. 13A and 13B are cross-sectional views showing a supporting member according to a fourth embodiment of the present disclosure.
Figure 13B:
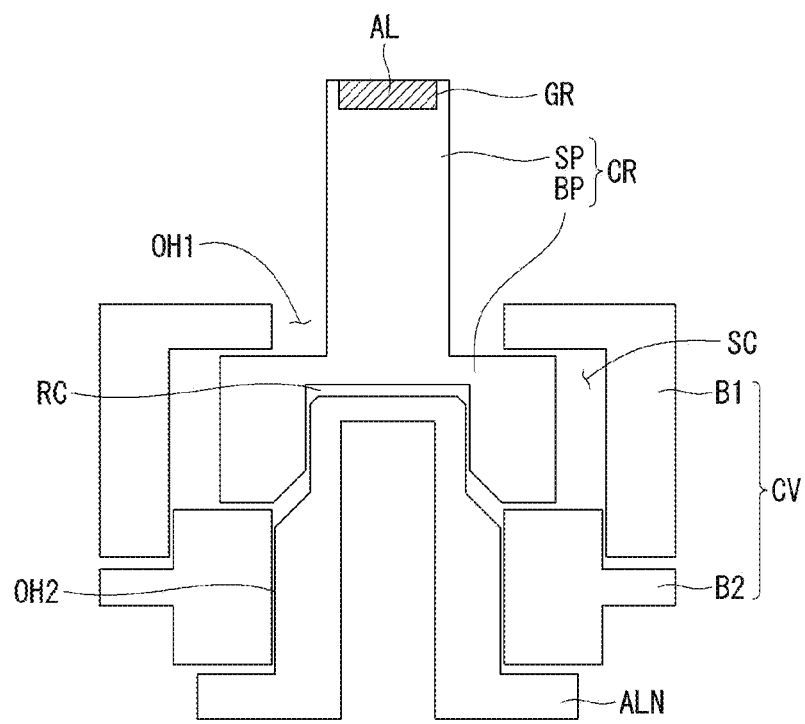

FIGS. 13A and 13B are cross-sectional views showing a supporting member according to a fourth embodiment of the present disclosure. In describing the fourth embodiment, detailed descriptions of elements that are substantially identical to those in the third embodiment will be omitted.

Referring to FIG. 13A, a backlight unit according to the fourth embodiment of the present disclosure includes a supporting member DPS. The supporting member DPS includes a cover CV and a core CR contained in the cover CV.

The cover CV may include a first body B1 and a second body B2. The first body B1 and the second body B2 are fastened together to form an internal space. The internal space formed by the first body B1 and the second body B2 may be called an accommodating part SC. At least part of the core CR is movably inserted into the accommodating part SC such that the core CR is able to move within the accommodating part SC.

A first open hole OH1 is formed in a part of the top of the first body B1. The top of the accommodating part SC is open through the first open hole OH1. A second open hole OH2 is formed in a part of the bottom of the second body B2. The bottom of the accommodating part SC is open through the second open hole OH2.

The core CR includes a base portion BP and a supporting portion SP. The base portion BP is contained movably in the accommodating part SC. The base portion BP includes a recess RC. The recess RC may be formed by inwardly and partially recessing the bottom surface of the base portion BP. The recess RC may open out through the second open hole OH2 (i.e., the recess RC may face the second open hole OH2).

The supporting portion SP may extend upward from the base portion BP and pass through the first open hole OH1 of the first body B1. The supporting portion SP extending through the first open hole OH1 supports the diffuser DP. The supporting portion SP includes a groove GR. The groove GR may be formed by inwardly and partially recessing the top surface of the supporting portion SP facing the diffuser DP. An adhesive layer AL is formed on the inside of the groove GR. The adhesive layer AL functions to fix the diffuser DP to supporting portion SP by its adhesive strength.

Referring FIG. 13B, the initial position of the base portion BP may be the center of the accommodating part SC. That is, the core CR may be initially placed at the center of the accommodating part SC, since it should be movable in every lateral direction in response to the expansion of the diffuser DP.

An aligner ALN may be used to fix the supporting portion SP and the diffuser DP when the initial position of the base portion BP is set. The aligner ALN is a structure for alignment of the core CR, which is removed after fixing the diffuser DP and the supporting member DPS.

The recess RC formed in the base portion BP is a portion in which the aligner ALN is inserted during a process for fixing the diffuser DP and the supporting portion SP. The aligner ALN may be inserted into the accommodating part SC through the second open hole OH2 of the second body B2, and part of the top of the aligner ALN may be inserted into the recess RC. The movement of the supporting portion SP temporarily fastened to the aligner ALN is restrained by the aligner ALN.

The movement of the base portion BP, while at the center of the accommodating part SC, may be restrained by the aligner ALN which is inserted through the second open hole OH2 and whose lateral movement is restrained. With the movement of the base portion BP being restrained, the supporting portion SP may be fixed to the diffuser DP. Therefore, the supporting portion SP and the diffuser DP may be fixed together, while the base portion BP is in the initial position.

In the fourth embodiment of the present disclosure, the initial position of the core CR constituting the supporting member DPS may be aligned correctly, thereby allowing the supporting member DPS to perform its function properly.

Through the above description, those skilled in the art will appreciate that various modifications and changes are possible, without departing from the scope and spirit of the disclosure. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit, comprising:
   a light source module including a light source, and a light source printed circuit board coupled to the light source;
   a diffuser positioned over the light source;
   a supporting member positioned between the light source printed circuit board and the diffuser, the supporting member keeping the light source and the diffuser separated by a preset distance, the supporting member including a groove in a surface of the supporting member that faces the diffuser; and
   an adhesive layer disposed inside of the groove.

2. The backlight unit of claim 1, further comprising:
   a fixing mount to which the supporting member is fixed; and
   a metal layer interposed between the underside of the supporting member and the fixing mount.

3. The backlight unit of claim 2 wherein the fixing mount is the light source printed circuit board.

4. The backlight unit of claim 2 wherein the supporting member is fixed to the fixing mount using surface-mount technology (SMT).

5. The backlight unit of claim 2 wherein the supporting member is made of a metal material, and the metal layer is made of nickel (Ni), tin (Sn), or an alloy thereof.

6. The backlight unit of claim 1 wherein the supporting member includes:
   a cover including a cavity and a first hole that exposes the cavity; and
   a core having a base portion and a supporting portion, the base portion being positioned in the cavity and movable, the supporting portion extending from the base portion and through the first hole, the supporting portion supporting the diffuser, the groove being formed in a surface of the supporting portion.

7. The backlight unit of claim 6 wherein a cross-sectional area of the base portion is smaller than a cross-sectional area of the cavity.

8. The backlight unit of claim 6 wherein an area of the first hole is smaller than a cross-sectional area of the base portion.

9. The backlight unit of claim 6 wherein the cover includes a second hole that exposes the cavity, and the base portion includes a recess that faces the second hole.

10. The backlight unit of claim 1 wherein the supporting member is formed of a white-colored material, a white coating layer is coated onto the surface of the supporting member, or the supporting member is formed of a transparent material.

11. A device, comprising:
    a substrate;
    a plurality of light sources on the substrate;
    a plurality of support members on the substrate, each of the plurality of support members including a cavity;
    a diffuser on the plurality of support members, the diffuser being spaced from the plurality of light sources by the plurality of support members; and
    adhesive in the cavities of the plurality of support members, the adhesive coupling the diffuser to the plurality of support members.

12. The device of claim 11, further comprising:
    a conductive layer between the substrate and the plurality of support members.

13. The device of claim 11, further comprising:
    a coating layer on the plurality of support members.

14. The device of claim 11 wherein at least one of the plurality of support members are positioned between two light sources of the plurality of light sources.

15. A device, comprising:
    a substrate;
    a light source on the substrate;
    a support member on the substrate, the support member including a groove in an upper surface of the support member;
    a diffuser on the upper surface of the support member; and
    an adhesive in the groove, the adhesive coupling the diffuser to the support member.

16. The device of claim 15 wherein the support member includes a cover that surrounds a first portion of the support member.

17. The device of claim 16 wherein the cover includes an opening, and a second portion of the support portion extends through the opening.

18. The device of claim 16 wherein the support member is configured to move within the cover.

19. The device of claim 15 wherein the support member includes another groove, and the groove and the another groove are positioned on opposite sides of the support member.

* * * * *